May 19, 1925. 1,538,115
F. HOVING
WEIGHING APPARATUS FOR POWDERED FUEL
Filed May 22, 1922
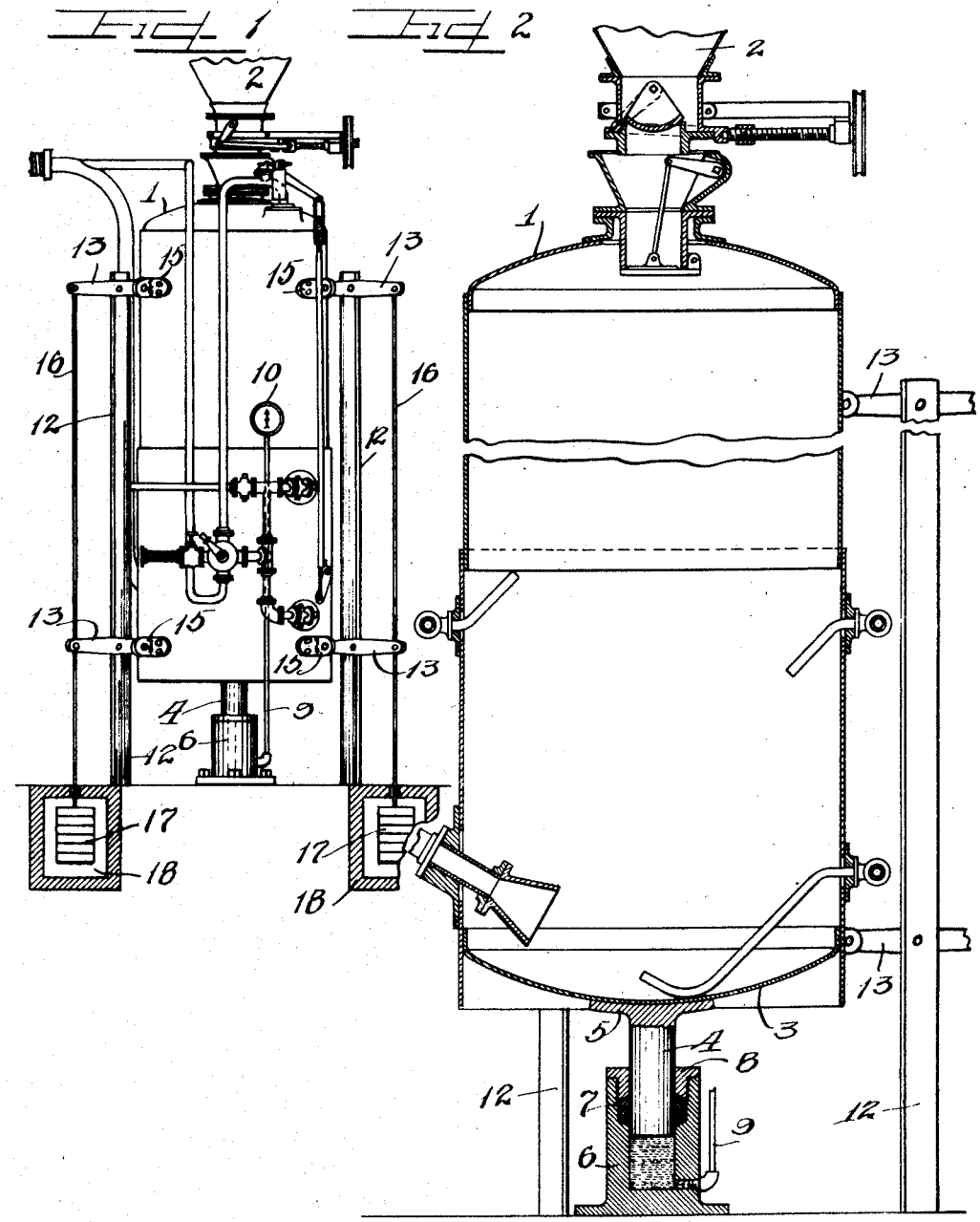

Patented May 19, 1925.

1,538,115

UNITED STATES PATENT OFFICE.

FRITZ HOVING, OF CHICAGO, ILLINOIS, ASSIGNOR, BY MESNE ASSIGNMENTS, TO RAYMOND BROS. ENGINEERING CO., OF CHICAGO, ILLINOIS, A CORPORATION OF ILLINOIS.

WEIGHING APPARATUS FOR POWDERED FUEL.

Application filed May 22, 1922. Serial No. 562,854.

*To all whom it may concern:*

Be it known that I, FRITZ HOVING, a citizen of the United States, and a resident of the city of Chicago, in the county of Cook and State of Illinois, have invented certain new and useful Improvements in a Weighing Apparatus for Powdered Fuel; and I do hereby declare that the following is a full, clear, and exact description of the same, reference being had to the accompanying drawings, and to the numerals of reference marked thereon, which form a part of this specification.

In an application of even date herewith for a transport system for powdered fuel, I have described an apparatus in which a tank is first partly filled with powdered coal and then emptied or partly emptied by having the coal blown into a transport system by compressed air.

It is an object of the invention set out in this application to provide for weighing the fuel delivered to the transport system in such an apparatus.

It is a further object of this invention to so mount the tank that the quantity of fuel contained in it may be determined at any time by an indication of its weight.

It is a further object of this invention to provide a hydrostatic method for weighing the tank and its contents whereby the weight may be indicated at any convenient observation point.

It is a further object of this invention to counterbalance the tank so that the strain upon the weighing apparatus shall never be excessive.

Other and further important objects of the invention will be apparent from the disclosures in the drawings and specification.

The invention (in a preferred form) is illustrated in the drawings and hereinafter more fully described.

On the drawings:

Figure 1 is an elevation of the apparatus, certain parts being shown in section.

Figure 2 is a central vertical section.

As shown on the drawings:

The apparatus includes a tank 1 situated beneath a funnel 2 by means of which powdered coal is delivered to the tank. The apparatus for controlling the delivery of powdered coal is not described in detail because it forms no part of the invention covered by the present application. A system of piping and valves for the delivery of compressed air to the tank and the conduct of a mixture of air and coal away from the tank are shown with more or less completeness but are not described herein because the details of such connections form no part of the invention covered by this application.

The bottom 3 of the tank is shown as convex downward. This is desirable for strength in supporting the weight but it is not an essential feature of the invention. The center of the bottom is supported upon a piston 4, the upper end of which is expanded as shown at 5 to afford ample bearing against the bottom 3. The lower end of the piston 4 is received within a cylinder 6 which is fixed to any suitable foundation underneath the tank. The packing 7 compressed by a gland 8 of a familiar form insures that there shall be no leakage between the piston and the entrance to the cylinder. A pipe 9 leads from the lower end of the cylinder to a pressure gauge 10. The pipe 9, and the interior of the cylinder 6, are filled with any suitable liquid so as to transmit the pressure of the piston to the pressure gauge mechanism. If the temperature never falls below freezing in the place where the tank is located, this liquid may be water, but oil, glycerine, alcohol or any other suitable liquid may be employed.

In order that the pressure gauge may not receive the full effect of all the weight of the tank upon the cylinder piston 4, a counterbalancing system is provided. This system is supported by uprights 12 arranged around the tank. The illustration is made to indicate that there are three of these uprights, but it is obvious that any desired number may be employed. Pivotally secured to the uprights are arms 13 which are also pivoted to ear pieces 15 secured to the vertical sides of the tank in any desired manner. In the illustration these ear pieces are secured by being provided with feet which are riveted to the tank, but it is obvious that they may be made integral with the walls of the tank or fastened thereto by welding or in any other desired manner. The other end of each arm extends from its pivot further than the distance to the ear 15 in order to obtain an effective leverage. The long arms of the levers are pivotally connected to rods or cables 16, to the lower ends of which are secured weights 17. For convenience these weights are arranged in a pit or pits 18 where they are out of the way and protected from interference.

The weights 17, by pulling down on the rods or cables 16, move the outer ends of the arms 13 downward and so move or tend to move the feet 15 upward. This moves the tank upward or at least diminishes the pressure due to the weight of the tank upon the piston 4. If the tank actually moves upward, flow of liquid will occur from the pipe 9 into the cylinder 6 and the reading of the gauge 10 will diminish accordingly. The weights 17 are sufficient to counterbalance the empty tank, and when the coal is all used up from the tank, the reading of the gauge 10 will be negative. As coal is introduced into the tank the weight of the tank and coal acting upon the piston 4 causes the piston to descend, or at least to increase its pressure upon the liquid in the cylinder 6. The liquid then flows into the pipe 9 or at least transmits pressure through said pipe, so that the reading of the gauge 10 increases. By watching the gauge 10 therefore the operator can tell when the tank has been filled to the desired amount and can shut off the supply of coal when this point is reached. When this is done, the gauge 10 will stand still indicating that no further change in weight is taking place. If then the supply of compressed air be manipulated so as to blow the coal out of the tank into the transport system, the weight of the tank will diminish and the operator will be able to tell how much coal has been delivered by watching the reading of the gauge 10 diminish. In this way the operator can keep track of how much coal is in the tank at any time and how much coal has been delivered by passing through the tank.

I am aware that numerous details of construction may be varied through a wide range without departing from the principles of this invention, and I therefore do not purpose limiting the patent granted otherwise than necessitated by the prior art.

I claim as my invention:

1. In a device of the class described, a tank, a series of uprights surrounding said tank, levers pivoted upon said uprights, one end of each of said levers being pivotally connected to the tank, weights connected to the other ends of said levers and counterbalancing said tank, and a weighing apparatus for indicating the difference between said counterbalancing and the weight of said tank and contents.

2. In a weighing apparatus of the character described, the combination of a vertically disposed container for receiving the material to be weighed, supports arranged adjacent said container, counter-weight mechanism comprising levers pivoted to said supports and attached to the container, and weights attached to the outer end of said levers and adapted to counter-balance the weight of said container, and means indicating the weight of the material introduced into said container comprising a closed chamber normally filled with a relatively dense fluid, a pressure gauge communicating with said closed chamber, and a piston arranged to transmit the weight of said material in such container to said pressure gauge.

3. In a weighing apparatus of the character described, the combination of a vertically disposed container for receiving the material to be weighed, supports arranged adjacent the container, counter-weight mechanism comprising levers pivoted to said supports and attached to the container and weights attached to the outer ends of said levers and adapted to counter-balance the weight of said container, and means for indicating the weight of the material introduced into said container comprising a closed chamber normally filled with a relatively dense fluid, a pressure gauge communicating with said closed chamber, and a piston adapted to be attached to the bottom of said container and to operate in said closed chamber to transmit the weight of said material through said fluid to said pressure gauge.

4. In a weighing apparatus of the character described, the combination of a vertically disposed container for receiving the material to be weighed, supporting posts arranged adjacent to said container, counter-weight mechanism for supporting the weight of said container comprising a plurality of levers pivoted to said posts and attached in vertical alignment to the upper and lower ends of said container, rods connecting the upper and lower levers in pairs, and weights attached to said rods, and means for indicating the weight of the material introduced into said container comprising a closed chamber normally filled with a relatively dense fluid, a pressure gauge communicating with said closed chamber, and a piston adapted to be attached to said container and to operate in said closed chamber to transmit the weight of said material to said pressure gauge through said relatively dense fluid.

5. In a weighing apparatus of the character described, the combination of a container for receiving the material to be weighed, a supporting structure, counter-weight mechanism comprising levers pivoted to said supporting structure and attached to the container, and weights attached to the levers and adapted to counter-balance the weight of said container, and means for indicating the weight of the material introduced into said container comprising a closed chamber normally filled with a relatively thin fluid, a pressure gauge communicating with said closed chamber, and a piston arranged to transmit the weight of said material in said container to said pressure gauge.

In testimony whereof I have hereunto subscribed my name in the presence of two subscribing witnesses.

FRITZ HOVING.

Witnesses:
CARLTON L. HILL,
JAMES N. O'BRIEN.